D. ROSENTHAL.
PNEUMATIC TIRE PROTECTING MAGNET.
APPLICATION FILED JUNE 3, 1914.
1,178,680.
Patented Apr. 11, 1916.
2 SHEETS—SHEET 1.
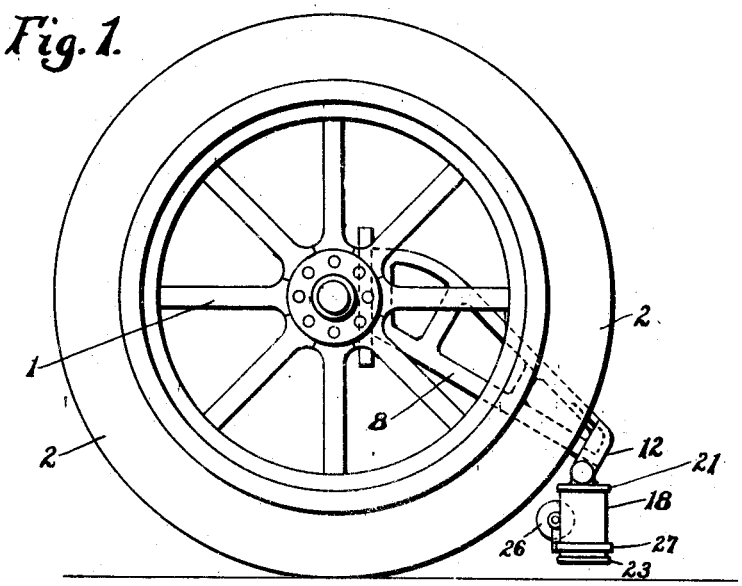
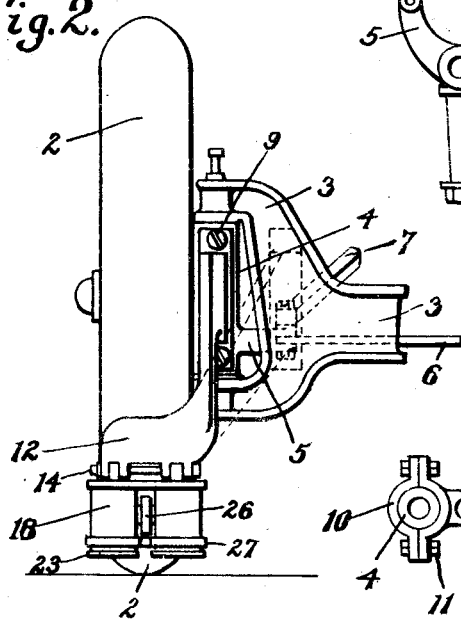
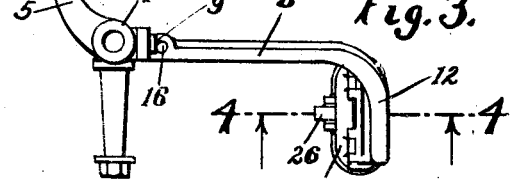
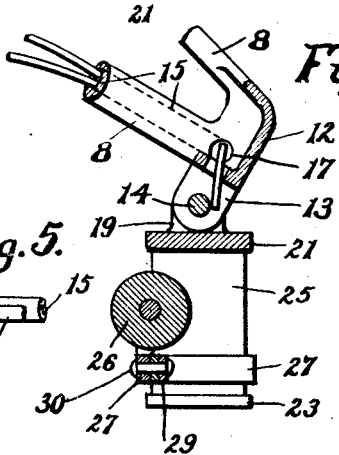
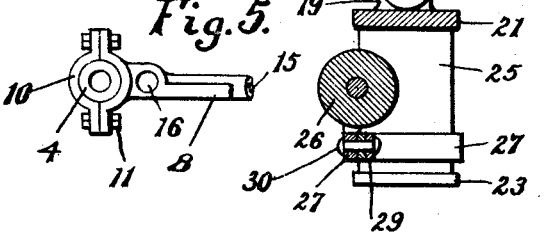
WITNESSES:
R. Lichtenstein
Bernard Beerman
INVENTOR.
David Rosenthal
BY David Lichtenstein
ATTY.

D. ROSENTHAL.
PNEUMATIC TIRE PROTECTING MAGNET.
APPLICATION FILED JUNE 3, 1914.
1,178,680.
Patented Apr. 11, 1916.
2 SHEETS—SHEET 2.
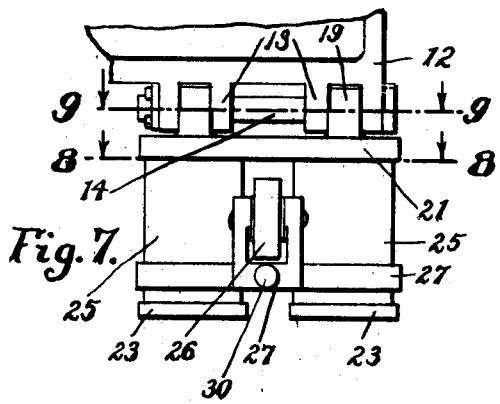
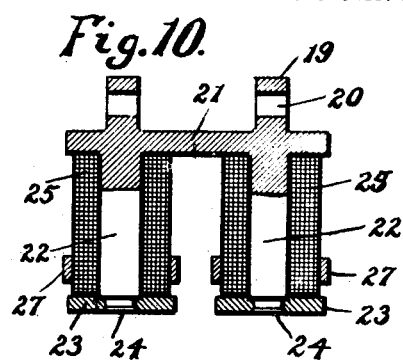
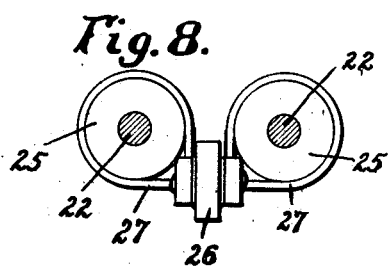
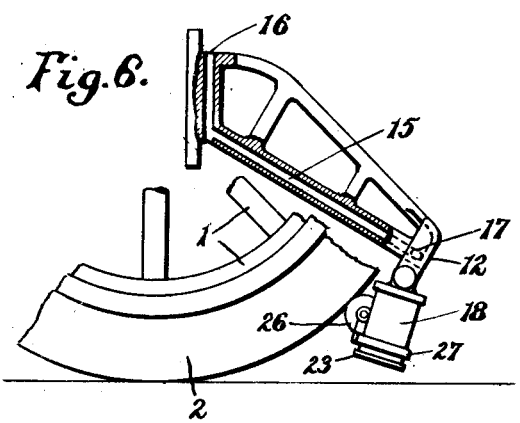
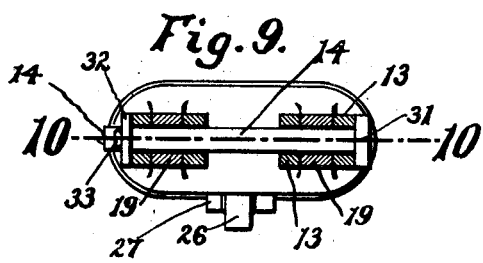
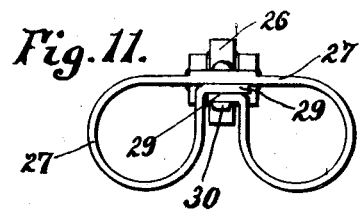
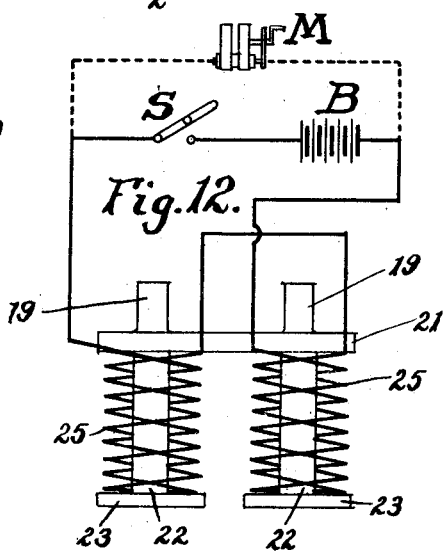
WITNESSES:
R. Lichtenstein
Bernard Beerman
INVENTOR,
David Rosenthal
BY David Lichtenstein
ATT'Y.

UNITED STATES PATENT OFFICE.

DAVID ROSENTHAL, OF BOSTON, MASSACHUSETTS.

PNEUMATIC-TIRE-PROTECTING MAGNET.

1,178,680.

Specification of Letters Patent. Patented Apr. 11, 1916.

Application filed June 3, 1914. Serial No. 842,717.

*To all whom it may concern:*

Be it known that I, DAVID ROSENTHAL, a citizen of the United States, residing at Boston, in the county of Suffolk and State of Massachusetts, have invented a new and useful Pneumatic-Tire-Protecting Magnet, of which the following is a specification.

My invention relates to pneumatic tire protecting means, and its object is to provide an electrical tire protector that may be applied to any type of vehicle equipped with inflated tires, for attracting and removing tire troubling obstacles composed of magnetic substances, such as scrapiron, chips of metal, tacks, nails, et cetera, from the path in which the tread of the tire is traveling,—thereby relieving the tire from the possibility of punctures commonly caused by contact with such magnetic obstacles; it being a known fact that a great number of punctures are brought on by the tire passing over such obstacles, which become embedded in the shoe of the tire and either work up to the inner tube and puncture it, or drop out and leave openings in the shoe, which fill up rapidly with grit and dirt and form clots (better known as "mud boils") which tend to weaken and destroy the shoe, ultimately resulting in "blow outs."

Another object is to provide a tire protecting magnet that may be carried on a vehicle equipped with pneumatic tires and current generating means, such as are commonly found in the cases of automobiles and motorcycles,—the magnet being supplied with current from said generating means and suspended directly in front of the tire sufficiently near to the ground to attract such loose obstacles, consisting of magnetic substances, as happen to be lying in the path that the tire is to travel in on the road,—thereby clearing the path ahead of the tire of all such obstacles.

Another object is to provide a tire protecting electromagnet (especially for self-propelled vehicles equipped with pneumatic tires) of sufficient lifting power to pick up road obstacles and particles possessing magnetic properties, such as are found scattered on the surface of the road in the path of the tire, the electromagnet being positioned ahead of the tire for attracting such obstacles from its path.

Another object is to provide an electro-
magnet, suspended from a bracket carried on a vehicle, equipped with pneumatic tires, in front of the same and in close proximity with the ground for attracting obstacles, passed over in the road, lying loose and consisting of magnetic substances,—the magnet being supplied with the necessary current from any suitable source of supply, either generated or carried on the vehicle for the purpose.

Still another object is to provide an electromagnet of sufficient lifting power to be located on a vehicle supplied with pneumatic tires, in front of the same, for clearing the path of the tire from all loose obstacles lying along the road and consisting of magnetic substances,—the magnet being swingingly suspended and provided with a guide-roller for preventing the magnet from injuring the tire when the magnet is swung toward the same.

With the above and other objects in view, my invention consists in the novel features of construction and arrangement of parts, hereinafter described and claimed and illustrated in the accompanying drawings.

Referring to the drawings:—Figure 1, is an elevation of a front automobile wheel, provided with the common type of pneumatic tire, showing my device applied to the same. Fig. 2, is a front view of Fig. 1, showing the bracket, from which the magnet is suspended, fixed to the front axle wheel spindle, so that the magnet will swing with the wheel when the same is being steered. Fig. 3, is a plan view of Fig. 1, showing the magnet-bracket fixed to the front axle wheel spindle. Fig. 4, is a view taken on line 4—4 in Fig. 3, looking in the direction of the arrows. Fig. 5, is a modified connection for coupling the bracket of my device to the front axle wheel spindle. Fig. 6, is the same view as Fig. 1, but shows the magnet swung in a position, with the roller-guide of the magnet engaging with the tread of the tire. The bracket is partly sectioned to show the chamber provided to accommodate the wires of the magnet running to the source where the current is supplied. Fig. 7, is a view of the magnet showing the roller-guide. Fig. 8, is a sectional view taken on line 8—8 in Fig. 7, looking in the direction of the arrows. Fig. 9, is a sectional view taken on line 9—9 in Fig. 7, looking in the direction of the arrows. Fig. 10, is a sectional view taken on line 10—10 in Fig. 9. Fig. 11, is a bottom view of the roller-guide and strap. Fig. 12, is a wiring diagram, showing two alternative connections, one showing the magnet wired to obtain current from a storage battery, and the other showing the magnet wired direct with a magneto; the storage battery and the magneto being of the type found common on self-propelled vehicles for ignition and lighting purposes.

Like numerals refer to like parts throughout the several views of the drawings.

The numeral 1 is an ordinary automobile wheel supplied with a pneumatic tire 2. 3 is a front axle of a car equipped with the common type of front axle spindle 4, on which the wheel 1 is carried and allowed to swing for steering purposes. The spindle 4 is provided with the ordinary steering-arm 5, which connects with the opposite front wheel of the automobile by the connecting-lever 6, and is operated from the steering wheel by the steering-lever 7.

8 is a bracket suspended from the axle spindle 4 in any suitable manner, preferably as shown in Figs. 2 and 3, where the bracket is held on the spindle 4 by the bolts 9, or as is shown in Fig. 5, by being clamped around the spindle 4 with the strap 10 and the tie-bolts 11. The projecting end 12 of the bracket 8 is provided with the lugs 13, which are drilled for the magnet-swivel-stud 14. The bracket 8 is provided with a wire recess 15, which recess is open at 16 and 17.

18 is an ordinary horseshoe or U-shaped type of electromagnet used for lifting purposes, and is specially designed with the supporting lugs 19 which are provided with the holes 20 for engaging with the swivel-stud 14. The yoke 21 is preferably made integral with the cores 22, which are provided at the bottom with the plates 23, the ends 24 of the cores 22 being riveted over and flushed with the bottom surface of the plates 23, as shown in Fig. 10. The cores 22 are provided with magnetizing coils 25, which are wound to allow the current to circulate in opposite directions, for producing a positive and a negative pole at the cheeks 24;—the magnetizing coils being wound of such dimensions as are known in common practice to produce the required lifting power of the magnet. The magnet 18 is provided with the roller-guide 26, which is rotatably held in the roller-strap 27, which strap is clamped around the magnetizing coils, with the ends 29 of the strap 27 bolted or riveted together by the stud 30. The swivel-stud 14 is preferably provided with the head 31 on one end and the washer 32 and the cotter-pin 33 on the other end, for holding the same in position.

In Fig. 12, M is an ordinary magneto commonly used in the ignition system on automobiles propelled by combustion engines, B is a common type of battery used in the ignition and lighting system on automobiles propelled by combustion engines, or otherwise, and S is a common type of switch, used in electric circuits.

Having thus described the parts of my invention in detail, the manner in which the same is used and operated is as follows:— The electromagnet is supplied with current from any suitable source of supply sufficient for producing the required lifting power of the magnet. Where the magnet is carried by a vehicle equipped with either a magneto, storage battery or generator, of sufficient strength, the magnet may be connected with any one of them for its current.

The supporting bracket 8 is designed to allow the electromagnet 18 to be swingingly suspended therefrom directly in front of the tire that it is intended to protect, and sufficiently near to the ground, (depending upon its lifting strength,) to attract magnetic substances coming in contact with it, while being carried along the road by the moving vehicle,—thus clearing the path ahead for the pneumatic tire to run in, of all loose lying magnetic obstacles, commonly found on the road and known to be injurious to the life of the tire. The magnet 18 is supported preferably in a swinging manner on the swivel-stud 14 for the purpose of protecting the magnet and allowing it to clear extraordinary projecting obstacles passed over in the road. The roller-guide 26, which is found on the side of the magnet nearest to the tire, is intended to keep the magnet from interfering with the tire and injuring it, when swung in the position shown in Fig. 6.

It must be understood that the magnet should be suspended close enough to the ground to give the required result; but that it may be designed and built with any desired lifting power for operating through a given distance from the ground, for attracting magnetic substances passed over by it. So that, while my drawings show the magnet suspended comparatively near to the ground, there is no reason why the same may not be higher,—it simply being a matter of providing a magnet that is strong enough to work through the distance that it is located above the ground. Also, while I have shown the magnet hung close to the tire, the same may be offset far enough away from the tire to clear it in the extreme position, and consequently eliminate the necessity for using the roller-guide.

While I have shown the magnet applied to a right hand front wheel of an automobile, the same may be applied to a left hand wheel, by using a left hand bracket. Also, I have shown my device applied to the front wheel of a vehicle for the reason that most of the vehicles have the rear wheels in line with the front wheels, and except in going around short curves, the rear wheels travel in the same path along the road as the front wheels do,—so that the obstacle, once removed for the front wheels, leaves the path clear for the rear wheels as well. However, I do not wish to be limited against using the magnet on the rear wheels as well as on the front wheels. Again, while I have shown the bracket fixed to the pivot-spindle of the front axle for following the wheel when it is being steered, the bracket may be fixed to be stationary with the front axle 3, as is indicated by the dotted position shown in Fig. 2. Also, while I have shown my device applied to an automobile wheel, I do not wish to be limited against using the same in connection with any other type of pneumatic wheel, especially that of the motorcycle, where my type of tire protector will be specially serviceable,—since the motorcycle tire is much more delicate and susceptible to punctures than the automobile tire.

It may be observed that my device is simple in construction, and inexpensive to manufacture, as well as inexpensive to operate. It may be applied to any type of vehicle using pneumatic tires, and will positively insure against punctures from petty obstacles consisting of magnetic substances.

While I realize that punctures are caused by other obstacles than those possessing magnetic properties, yet it is a fact that such obstacles are credited with causing no less than 25% of all punctures, and my device is intended to eliminate punctures to that extent.

While the preferred embodiments of the invention have been described in detail, it must be understood that I do not wish to be limited to the particular construction set forth, since various changes in the form, proportion and arrangement of parts and in the details of construction may be resorted to without departing from the spirit and scope of the invention.

Having thus described the invention, I claim:—

1. A pneumatic tire protecting magnet of the character described, consisting of an electromagnet; means for pivotally suspending the same from a vehicle; and means provided on said vehicle for supplying the current to said electromagnet.

2. A pneumatic tire protecting magnet of the character described, consisting of an electromagnet provided with a roller-guide and suspending lugs; a suspending member adapted to be rigidly fixed to a vehicle and provided with suspending lugs; and a pivot stud engaging with said suspending lugs for pivotally suspending said electromagnet.

3. A pneumatic tire protecting magnet of the character described, consisting of a horseshoe type electromagnet, having suspending lugs provided in the yoke of the same; a roller-guide carried on said magnet; a suspending bracket provided with suspending lugs and recesses for the wires connecting with said magnet; and a pivoting-pin adapted to pivotally engage said magnet with said bracket.

4. A pneumatic tire protecting magnet of the character described, consisting of a U-shaped electromagnet, having the yoke of the same provided with suspending lugs; a roller-guide member adapted to be strapped to said electromagnet; a suspending-arm provided with suspending-lugs and adapted to be secured to a vehicle; a pivoting bolt for pivotally coupling said electromagnet with said suspending-arm; and generating means provided on said vehicle for supplying said magnet with energizing current.

5. A pneumatic tire protecting magnet, of the character described, consisting of a U-shaped lifting electromagnet, having the yoke provided with suspending-lugs; a roller-guide adapted to be strapped around the magnetizing coils of said magnet; a rigid carrier-arm adapted to be fixed to a vehicle and provided with suspending-lugs; and a pivoting-pin for pivotally engaging the suspending-lugs of said magnet with said carrier-arm.

6. A pneumatic tire protecting magnet of the character described, consisting of a U-shaped lifting electromagnet having the yoke and the cores of the same made integral and provided with suspending-lugs; a suspending bracket provided with suspending-lugs and a wire recess, and adapted to be rigidly fixed to a vehicle; a coupling member adapted to swingingly engage said magnet with said suspending bracket; a roller-guide member adapted to be rigidly fixed to said magnet; and means provided on said vehicle for supplying the current to said magnet.

7. A pneumatic tire protecting magnet of the character described, consisting of a U-shaped lifting electromagnet, having the yoke and the cores of the same made integral and provided with suspending-lugs; a suspending bracket having wire recesses and adapted to be clamped in position by a clamping member, provided on the same; a coupling member adapted to swingingly engage said magnet with said suspending bracket; and a roller-guide member adapted to be rigidly fixed to said magnet.

8. A pneumatic tire protecting magnet of the character described, consisting of an electromagnet in circuit with the ignition source of a combustion engine carried on a self-propelled vehicle; and means for pivotally suspending said magnet ahead of the tire and in line with the path of the tread of the same.

9. A pneumatic tire protecting magnet of the character described, consisting of a horseshoe type electromagnet connected in circuit with any suitable source of current supply, commonly carried on self-propelled vehicles for lighting or ignition purposes; and means for pivotally suspending said magnet in line with and ahead of the wheels of said vehicle, for attracting obstacles of magnetic properties from the path in which the wheels are to run.

Signed at Boston, in the county of Suffolk and State of Massachusetts, this twenty-third day of May, 1914.

DAVID ROSENTHAL.

Witnesses:
B. H. CHERTOK,
R. LICHTENSTEIN.